United States Patent
Sagae et al.

(10) Patent No.: US 9,166,763 B2
(45) Date of Patent: Oct. 20, 2015

(54) MOBILE COMMUNICATION METHOD, RADIO BASE STATION, AND MOBILE STATION

(71) Applicant: NTT DOCOMO, INC., Tokyo (JP)

(72) Inventors: Yuta Sagae, Tokyo (JP); Hiromasa Umeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/261,861

(22) PCT Filed: Nov. 9, 2012

(86) PCT No.: PCT/JP2012/079158
§ 371 (c)(1),
(2) Date: May 14, 2014

(87) PCT Pub. No.: WO2013/073479
PCT Pub. Date: May 23, 2013

(65) Prior Publication Data
US 2014/0286201 A1 Sep. 25, 2014

(30) Foreign Application Priority Data

Nov. 14, 2011 (JP) .................................. 2011-248774

(51) Int. Cl.
H04W 52/24 (2009.01)
H04W 16/14 (2009.01)
H04W 52/30 (2009.01)
H04W 52/36 (2009.01)
(Continued)

(52) U.S. Cl.
CPC ............ *H04L 5/0062* (2013.01); *H04B 1/0057* (2013.01); *H04L 5/14* (2013.01); *H04W 16/14* (2013.01); *H04W 52/244* (2013.01); *H04W 52/30* (2013.01); *H04W 52/367* (2013.01); *H04W 72/1215* (2013.01)

(58) Field of Classification Search
None
See application file for complete search history.

(56) References Cited

U.S. PATENT DOCUMENTS 6,366,604 B1 * 4/2002 Mohindra ...................... 375/146
2005/0206478 A1 * 9/2005 Satoh et al. .................... 333/133
(Continued)

FOREIGN PATENT DOCUMENTS

JP 2009 100452 5/2009

OTHER PUBLICATIONS

Author Unknown, UE implementation assumption for APAC700 (FDD), Doc. No. R4-115184, Submission to 3GPP TSG-RAN WG4 #60BIS, Oct. 14, 2011, pp. 1-4.*
(Continued)

*Primary Examiner* — Christopher Crutchfield
(74) *Attorney, Agent, or Firm* — Oblon, McClelland, Maier & Neustadt, L.L.P.

(57) ABSTRACT

A duplexer D1 or D2 to be used is appropriately selected from multiple duplexers D1 and D2. A mobile communication method of the invention is a mobile communication method for a mobile communication system 1 operated in a band F1. The method includes: a step A of causing a radio base station eNB in the mobile communication system 1 to notify a mobile station UE of information concerning a system X operated in a band 2 adjacent to the band F1 and information concerning a system Y operated in a band 3 adjacent to the band 1; and a step B of causing the mobile station UE to select a duplexer D1 (or D2) to be used from multiple duplexers D1 and D2 on the basis of the information concerning the system X and the information concerning the system Y.

7 Claims, 6 Drawing Sheets

(51) Int. Cl.
*H04W 72/12* (2009.01)
*H04B 1/00* (2006.01)
*H04L 5/00* (2006.01)
*H04L 5/14* (2006.01)

(56) References Cited

U.S. PATENT DOCUMENTS

| | | | |
|---|---|---|---|
| 2009/0088083 A1 | 4/2009 | Fujii et al. | |
| 2011/0110254 A1* | 5/2011 | Ji et al. | 370/252 |
| 2013/0039277 A1* | 2/2013 | Li et al. | 370/328 |
| 2014/0044023 A1* | 2/2014 | Kazmi et al. | 370/278 |

OTHER PUBLICATIONS

Author Unknown, 700 MHz band in Asia, Doc. No. R4-114239, Submission to 3GPP TSG-RAN WG4 #60, Aug. 26, 2011, pp. 1-4.*

3GPP TSG-RAN WG4 #60BIS R4-115184, "UE implementation assumption for APAC700 (FDD)", NTT Docomo, Total 4 pages, (Oct. 10 to 14, 2011).

3GPP TS 36.101 V10.4.0, "3rd Generation Partnership Project; Technical Specification Group Radio Access Network; Evolved Universal Terrestrial Radio Access (E-UTRA); User Equipment (UE) radio transmission and reception (Release 10)", LTE Advanced 3GPP, pp. 1-243, (Sep. 2011).

3GPP TS 36.104 V10.4.0, "3rd Generation Partnership Project; Technical Specification Group Radio Access Network; Evolved Universal Terrestrial Radio Access (E-UTRA); Base Station (BS) radio transmission and reception (Release 10)", LTE Advanced 3GPP, pp. 1-112, (Sep. 2011).

3GPP TS 36.331 V10.3.0, "3rd Generation Partnership Project; Technical Specification Group Radio Access Network; Evolved Universal Terrestrial Radio Access (E-UTRA); Radio Resource Control (RRC); Protocol specification (Release 10)", LTE Advanced 3GPP, pp. 1-296, (Sep. 2011).

International Search Report Issued Dec. 18, 2012 in PCT/JP12/079158 Filed Nov. 9, 2012.

* cited by examiner

| NS | SYSTEM TO BE PROTECTED | PROTECTION STANDARD | INTERFERING SYSTEM |
|---|---|---|---|
| 0 | X | P1 | Y |
| 1 | Y | P2 | Z |
| ⋮ | ⋮ | ⋮ | ⋮ |

US 9,166,763 B2

MOBILE COMMUNICATION METHOD, RADIO BASE STATION, AND MOBILE STATION

TECHNICAL FIELD

The present invention relates to a mobile communication method, a radio base station, and a mobile station.

BACKGROUND ART

An LTE (Long Term Evolution) mobile communication system is required to be operated while satisfying protection standards for adjacent frequency bands.

As shown in FIG. 6, the LTE specifications permit the system to reduce the maximum allowable transmission power of a mobile station UE when it is difficult to comply with the protection standards. In general, such an amount of reduction is called "A-MPR (Additional-Maximum Power Reduction)."

In a region where the "A-MPR" is applicable, a radio base station eNB is configured to notify of a method for applying the "A-MPR" by broadcasting a network signaling value called "NS (Network Signaling)" or "additionalSpectrumEmission" which is defined for a supported band.

In an example of FIG. 6, in a region A, a frequency band in which a system X is operated has a sufficient gap from a frequency band in which a system Y is operated. Accordingly, an interference level from the system X is attenuated to an allowable interference level in the system Y.

On the other hand, in a region B, sufficient attenuation of the interference level from the system X cannot be expected in the system Y. Hence, the radio base station eNB in the system X notifies the mobile station UE of the "A-MPR" by using the NS.

PRIOR ART DOCUMENTS

Non-Patent Documents

Non-patent document 1: 3GPP TS36.101
Non-patent document 2: 3GPP TS36.104
Non-patent document 3: 3GPP TS36.331

SUMMARY OF THE INVENTION

A method (Dual Duplexer) is currently under consideration, which is to cover a broad band having a narrow guard band between an uplink frequency band and a downlink frequency band, by use of multiple duplexers D1 and D2 having different filtering characteristics.

For example, a band "APAC700" as shown in FIG. 7(a) is discussed at present in meetings for defining the LTE specifications.

However, it is difficult to produce a duplexer provided with a steep filtering characteristic having only a small loss in a passband within a band having such features as those of the band "APAC700." For this reason, the "Dual Duplexer" as shown in FIG. 7(b) is considered for LTE.

In addition, in some regions, different systems are operated in adjacent frequency bands. According to the current LTE specifications, by using the NS, it is possible to notify the mobile station UE of the protection standards and information on a radio system (a system to be protected) with which the mobile station UE may interfere if the mobile station UE performs transmission at the maximum transmission power.

In this case, "permission to reduce the maximum transmission power" can be notified of by using the NS.

Here, from the viewpoint of improvements in the filtering characteristics (RF characteristics) such as receiving sensitivity and blocking performance, there is a case where it is preferable that the mobile station UE select a duplexer D1 (or D2) to be used from the multiple duplexers D1 and D2 on the basis of an operational status of the radio system (an interfering system) which is likely to exert an interference influence on the mobile station UE.

For instance, in the example of FIG. 8, the mobile station UE can use any of the multiple duplexers D1 and D2 in frequency bands F700A and F700B within the band "APAC700."

However, downlink communication performed in the frequency band F700B is influenced by the interfering system because the filtering characteristic (the blocking performance) of the duplexer D2 is not steep enough to avoid the interference of the interfering system.

On the other hand, in the downlink communication performed in the frequency band F700B, the mobile station UE using the duplexer D1 is hardly influenced by the interfering system because the interference of the interfering system is sufficiently attenuated by the filtering characteristic (the blocking performance) of the duplexer D1.

Nevertheless, as described above, the current LTE specifications are unable to notify the mobile station UE of the information concerning the system (the interfering system) which exerts the interference influence on the targeted mobile communication system. This causes a problem that the mobile station UE cannot select the appropriate duplexer D1 or D2.

The present invention has been made in view of the aforementioned problem. An objective of the present invention is to provide a mobile communication method, a radio base station, and a mobile station, which enable appropriate selection of a duplexer D1 or D2 to be used from the multiple duplexers D1 and D2.

A first feature of the present invention is summarized as a mobile communication method for a first mobile communication system operated in a first frequency band, including: a step A of causing a radio base station in the first mobile communication system to notify a mobile station of information concerning a second system operated in a second frequency band adjacent to the first frequency band and information concerning a third system operated in a third frequency band adjacent to the first frequency band; and a step B of causing the mobile station to select a duplexer to be used from a plurality of duplexers on the basis of the information concerning the second system and the information concerning the third system. Here, the second system is a system which is likely to receive an interference influence from the first mobile communication system, and the third system is a system which is likely to exert an interference influence on the first mobile communication system.

A second feature of the present invention is summarized as a mobile communication method of performing downlink communication by carrier aggregation using a first frequency band and a fourth frequency band and performing uplink communication in the fourth frequency band in a first mobile communication system, the method including: a step A of causing a radio base station in the first mobile communication system to notify, in the first frequency band, a mobile station of information concerning a third system operated in a third frequency band adjacent to the first frequency band without notifying of information concerning a second system operated in a second frequency band adjacent to the first frequency band; and a step B of causing the mobile station to select a duplexer to be used in the first frequency band from a plurality of duplexers on the basis of the notified information concerning the third system. Here, the second system is a system which is likely to receive an interference influence from the first mobile communication system, and the third system is a system which is likely to exert an interference influence on the first mobile communication system.

A third feature of the present invention is summarized as a radio base station used in a first mobile communication system operated in a first frequency band, including: a transmission unit configured to notify a mobile station of information concerning a second system operated in a second frequency band adjacent to the first frequency band and information concerning a third system operated in a third frequency band adjacent to the first frequency band. Here, the second system is a system which is likely to receive an interference influence from the first mobile communication system, and the third system is a system which is likely to exert an interference influence on the first mobile communication system.

A fourth feature of the present invention is summarized as a mobile station used in a first mobile communication system operated in a first frequency band, including: a reception unit configured to receive from a radio base station in the first mobile communication system information concerning a second system operated in a second frequency band adjacent to the first frequency band and information concerning a third system operated in a third frequency band adjacent to the first frequency band; and a selection unit configured to select a duplexer to be used from a plurality of duplexers on the basis of the information concerning the second system and the information concerning the third system. Here, the second system is a radio system which is likely to receive an interference influence from the first mobile communication system, and the third system is a radio system which is likely to exert an interference influence on the first mobile communication system.

A fifth feature of the present invention is summarized as a mobile station configured to perform downlink communication by carrier aggregation using a first frequency band and a fourth frequency band and to perform uplink communication in the fourth frequency band in a first mobile communication system, the mobile station including: a reception unit configured to receive, in the first frequency band, from a radio base station in the first mobile communication system information concerning a third system operated in a third frequency band adjacent to the first frequency band without receiving information concerning a second system operated in a second frequency band adjacent to the first frequency band; and a selection unit configured to select a duplexer to be used in the first frequency band from a plurality of duplexers on the basis of the information concerning the third system received by the reception unit. Here, the second system is a radio system which is likely to receive an interference influence from the first mobile communication system, and the third system is a radio system which is likely to exert an interference influence on the first mobile communication system.

Figure 1:
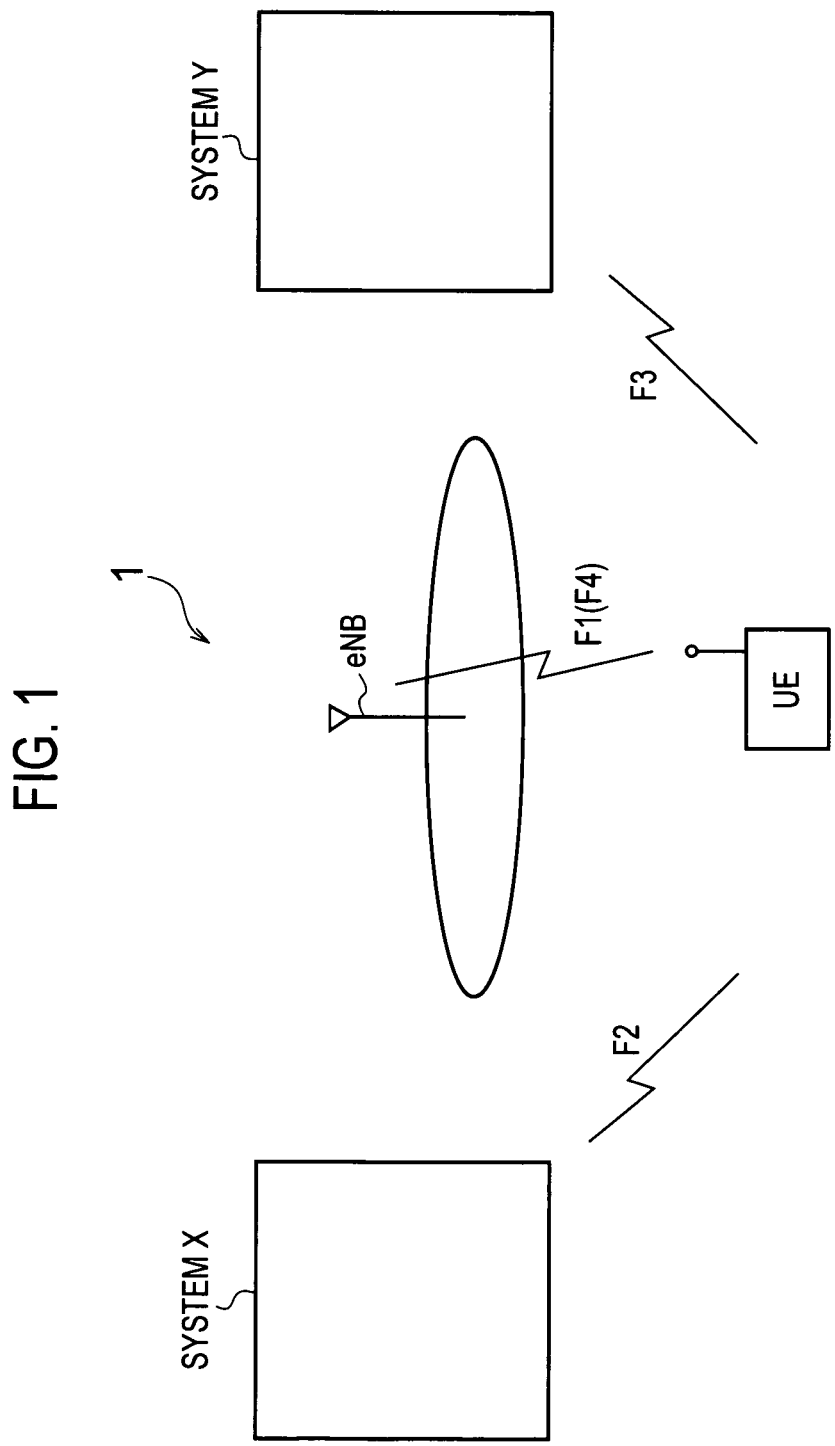
FIG. 1 is an overall configuration diagram of a mobile communication system according to a first embodiment of the present invention.

MODE FOR CARRYING OUT THE INVENTION (Mobile Communication System of First Embodiment of Invention)

A mobile communication system 1 according to a first embodiment of the present invention will be described with reference to FIG. 1 to FIG. 5. Throughout the drawings for describing the embodiment, components having the same functions will respectively be denoted by the same reference numerals and repeated explanations will be omitted.

The mobile communication system 1 of the embodiment supports LTE (Release-8/9/10, or a subsequent release), and includes a radio base station eNB and a mobile station UE as shown in FIG. 1.

In addition, the mobile communication system 1 is configured to be operated in a band F1. Here, the expression "band" corresponds to a "EUTRA band" as defined in 3GPP TS36.101.

Moreover, in the mobile communication system 1, the radio base station eNB is configured to issue broadcast information to notify of a band number for specifying the band.

According to the LTE specifications, the mobile station UE used in the mobile communication system 1 is configured to have a function to deal with NS that corresponds to the band number.

Meanwhile, as shown in FIG. 1, a system X operated in a band F2 and a system Y operated in a band F3 are present in the vicinity of the mobile communication system 1 of the embodiment.

Here, each of the systems X and Y may be any one of: a mobile communication system adopting the same communication method as that of the mobile communication system 1; a mobile communication system adopting a different communication method from that of the mobile communication system 1; a television broadcasting system; and other communication systems and broadcasting systems.

Furthermore, the mobile communication system 1 may be configured to be capable of performing downlink communication by carrier aggregation (Downlink Inter-band CA) using the band F1 and a band F4 (a fourth frequency band) while performing uplink communication in the band F4.

Figures 2, 3:
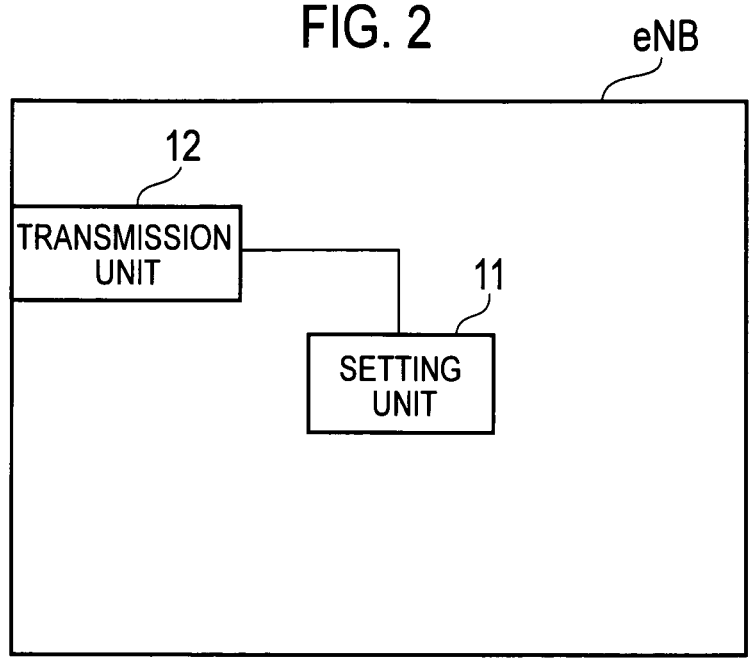
FIG. 2 is a functional block diagram of a radio base station according to the first embodiment of the present invention.
FIG. 3 is a view showing an example of NS used in the mobile communication system according to the first embodiment of the present invention.

As shown in FIG. 2, the radio base station eNB includes a setting unit 11 and a transmission unit 12.

The setting unit 11 is configured to set the NS to be broadcasted in a cell under the control of the radio base station eNB. Here, as shown in FIG. 3, each NS is associated with information concerning the system to be protected, the protection standard information, and the information concerning the interfering system.

The transmission unit 12 is in a cell under the control of the radio base station eNB configured to notify the mobile station UE, in the band F1, of information concerning the system to be protected, the protection standard information, and the information concerning the interfering system, by means of network signaling (by broadcasting the NS, for example.)

Here, the transmission unit 12 may be configured to notify the mobile station UE, in the band F1, of the information concerning the system to be protected, the protection standard information, and the information concerning the interfering system, in the cell under the control of the radio base station eNB by using dedicated signaling or common signaling instead of using the NS.

In the case where the downlink communication is performed by the carrier aggregation (Downlink Inter-band CA) using the band F1 and the band F4 while the uplink communication is performed in the band F4, the transmission unit 12 may be configured not to notify in the band F1 of the above-mentioned information concerning the system to be protected.

Figure 4:
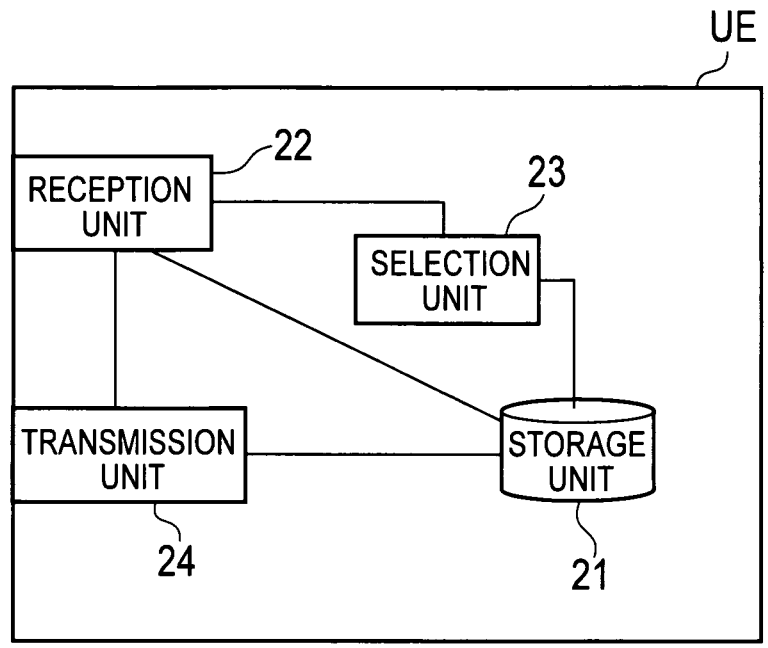
FIG. 4 is a functional block diagram of a mobile station according to the first embodiment of the present invention.

As shown in FIG. 4, the mobile station UE includes a storage unit 21, a reception unit 22, a selection unit 23, and a transmission unit 24.

The storage unit 21 is configured to store a table which associates the NS, the information concerning the system to be protected, the protection standard information, and the information concerning the interfering system with one another, such as the table shown in FIG. 3.

The reception unit 22 is configured to receive the NS which is broadcasted by the radio base station eNB. In this case, the reception unit 22 is configured to acquire from the storage unit 21 the information concerning the system to be protected, the protection standard information, and the information concerning the interfering system, each corresponding to the received NS.

Alternatively, the reception unit 22 may be configured to receive signaling from the radio base station eNB, the signaling being designed to notify of the information concerning the system to be protected, the protection standard information, and the information concerning the interfering system.

In the case where the downlink communication is performed by the carrier aggregation (Downlink Inter-band CA) using the band F1 and the band F4 while the uplink communication is performed in the band F4, the reception unit 22 may be configured not to receive in the band F1 the above-mentioned information concerning the system to be protected.

The selection unit 23 is configured to select a duplexer D1 (or D2) to be used from multiple duplexers D1 and D2 on the basis of the information concerning the system to be protected and the information concerning the interfering system, each corresponding to the NS received by the reception unit 22.

In the case where the downlink communication is performed by the carrier aggregation (Downlink Inter-band CA) using the band F1 and the band F4 while the uplink communication is performed in the band F4, the selection unit 23 may be configured to select the duplexer D1 (or D2) to be used from the multiple duplexers D1 and D2 constituting an RF circuit for the band F1, on the basis of the information concerning the interfering system without using the information concerning the system to be protected even though the information concerning the system to be protected is received in the band F1.

In this case, the above-mentioned configuration can be adopted because the uplink communication is not performed in the band F1 and an interference influence on the system X (the system to be protected) from the mobile communication system 1 is therefore negligible.

The transmission unit 24 is configured to reduce transmission power on the basis of the protection standard information and the information (such as the A-MPR) necessary for satisfying the protection standard, each corresponding to the NS received by the reception unit 22.

An example of an operation of the mobile station UE in the mobile communication system 1 of the embodiment will be described below with reference to Fig. 5.

The embodiment is based on the premise that one radio system to be protected and one interfering system are present in an adjacent frequency band. However, the number of the radio systems to be protected or the number of the interfering systems does not have limitations. Meanwhile, any of the above-mentioned numbers may be zero.

Figure 5:
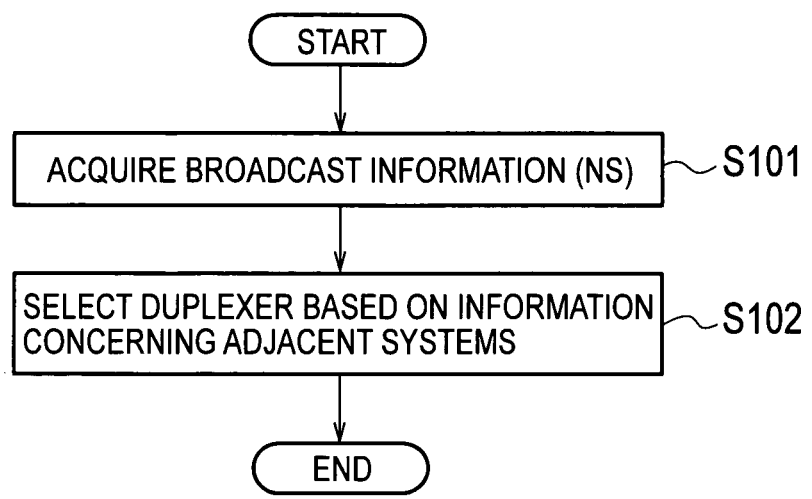
FIG. 5 is a flowchart showing an operation of the mobile station according to the first embodiment of the present invention.
Figure 6:
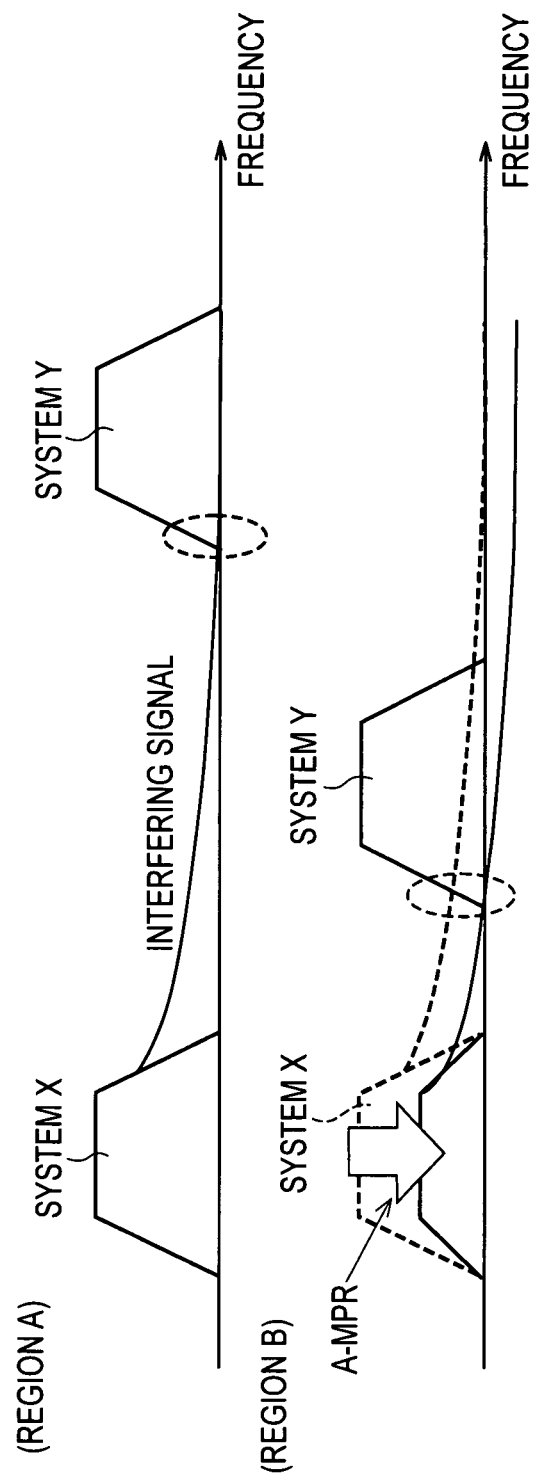
FIG. 6 is a diagram for explaining a conventional mobile communication system.
Figure 7:
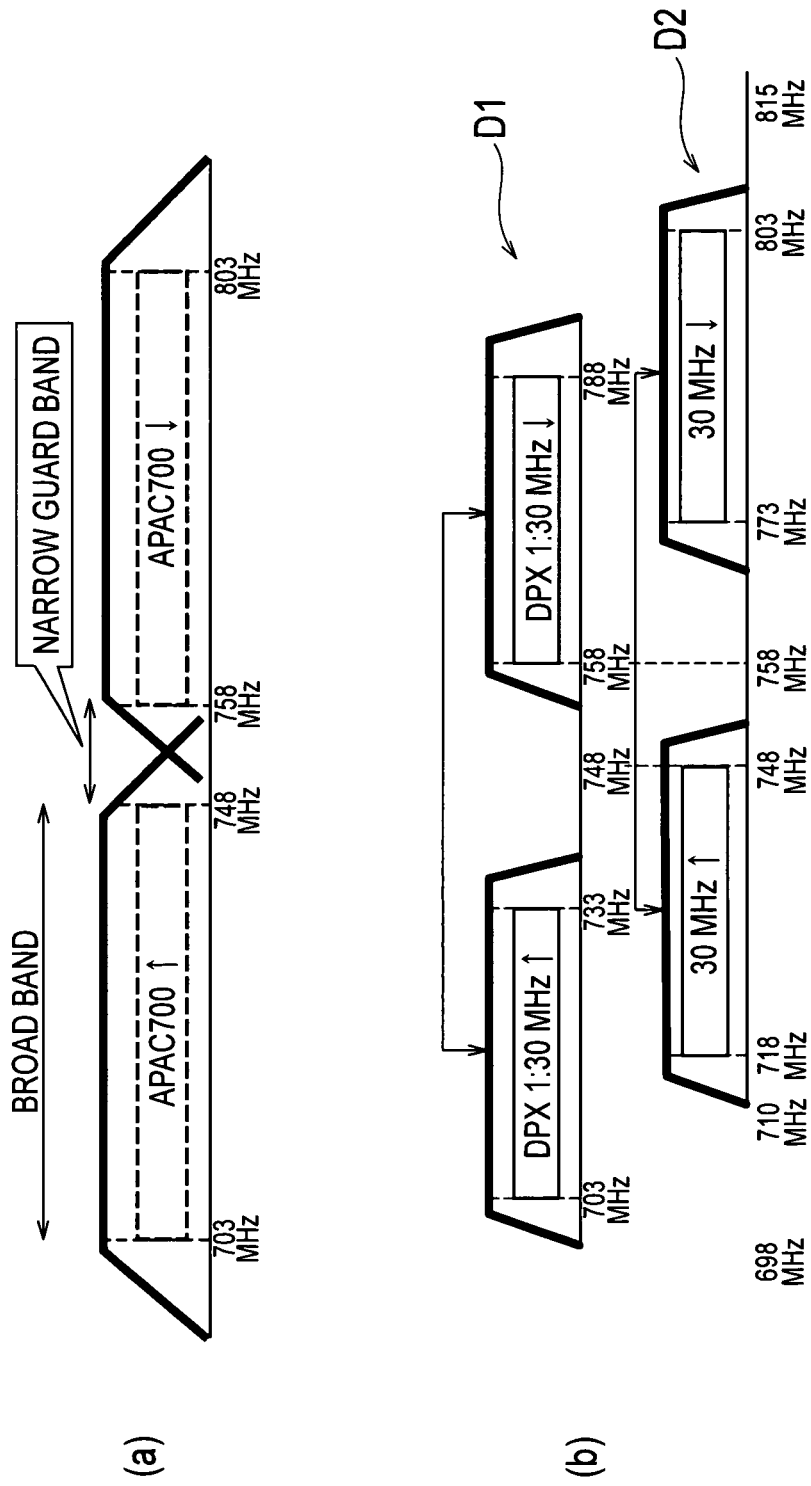
FIG. 7 is a diagram for explaining the conventional mobile communication system.
Figure 8:
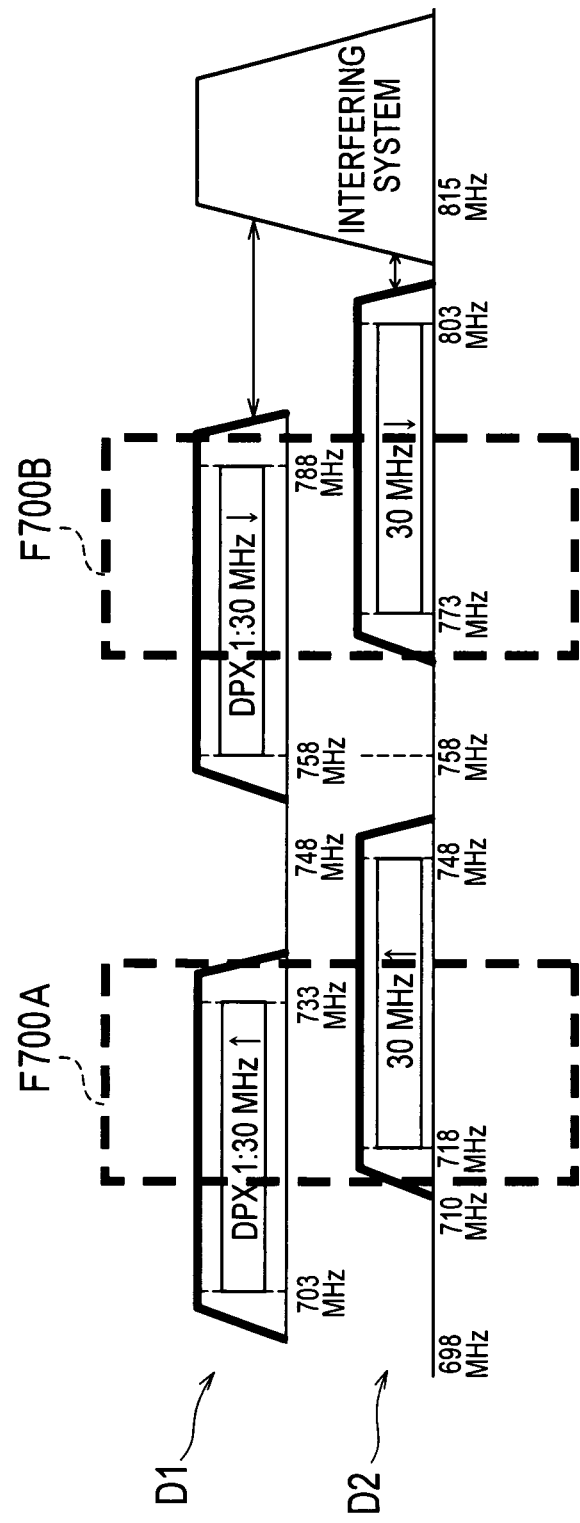
FIG. 8 is a diagram for explaining the conventional mobile communication system.

As shown in Fig. 5, in step S101, the mobile station UE specifies (searches for) a central frequency in the downlink communication of the mobile communication system 1, and acquires the broadcast information containing the NS.

In step S102, when the mobile station UE judges that the multiple duplexers Dl and D2 are available in the band including the central frequency, the mobile station UE selects a duplexer D1 (or D2) to be used on the basis of the information concerning the system to be protected and the information concerning the interfering system, each corresponding to the received NS.

According to the mobile communication system of the first embodiment of the present invention, the radio base station eNB is configured to notify the mobile station UE of the information concerning the interfering system in addition to the information concerning the system to be protected and the protection standard information. Thus, the mobile station UE can select the appropriate duplexer D1 (or D2) on the basis of the information concerning the system to be protected and the information concerning the interfering system.

The above-described features of the embodiment may also be expressed as follows.

A first feature of the embodiment is summarized as a mobile communication method, which is a mobile communication method for a mobile communication system 1 (a first mobile communication system) operated in a band F1 (a first frequency band). The method includes: a step A of causing a radio base station eNB in the mobile communication system 1 to notify a mobile station UE of information concerning a system X (a second system) operated in a band F2 (a second frequency band) adjacent to the band F1 and information concerning a system Y (a third system) operated in a band F3 (a third frequency band) adjacent to the band F1; and a step B of causing the mobile station UE to select a duplexer D1 (or D2) to be used from multiple duplexers D1 and D2 on the basis of the information concerning the system X and the information concerning the system Y. Here, the system X is a radio system (a system to be protected) which is likely to receive an interference influence from the mobile communication system 1, and the system Y is a radio system (an interfering system) which is likely to exert an interference influence on the mobile communication system 1.

In the first feature of the embodiment, in the step A, by use of the network signaling (by using NS, for example,) the radio base station eNB may notify of the information concerning the system X and the information concerning the system Y as information concerning the systems operated in the bands adjacent to the band F1.

A second feature of the embodiment is summarized as a mobile communication method of performing downlink communication by carrier aggregation (Downlink Inter-band CA) using a band F1 and a band F4 (a fourth frequency band) and performing uplink communication in the band F4 in a mobile communication system 1. The method includes: a step A of causing a radio base station eNB in the mobile communication system 1 to notify, in the band F1, a mobile station UE of information concerning a system Y operated in a band F3 adjacent to the band F1 without notifying of information concerning a system X operated in a band F2 adjacent to the band F1; and a step B of causing the mobile station UE to select a duplexer D1 (or D2) to be used in the band F1 and the band F4 from multiple duplexers D1 and D2 on the basis of the notified information concerning the system Y.

A third feature of the embodiment is summarized as a radio base station eNB used in a mobile communication system 1 operated in a band F1, which includes a transmission unit 12 configured to notify a mobile station UE of information concerning a system X operated in a band F2 adjacent to the band F1 and information concerning a system Y operated in a band F3 adjacent to the band F1.

In the third feature of the embodiment, the transmission unit 12 may notify of the information concerning the system X and the information concerning the system Y as information concerning the systems operated in the bands adjacent to the band F1, by network signaling (by using NS, for example.)

A fourth feature of the embodiment is summarized as a mobile station UE used in a mobile communication system 1 operated in a band F1, which includes: a reception unit 22 configured to receive from a radio base station eNB in the mobile communication system 1 information concerning a system X operated in a band F2 adjacent to the band F1 and information concerning a system Y operated in a band F3 adjacent to the band F1; and a selection unit 23 configured to select a duplexer D1 (or D2) to be used from multiple duplexers D1 and D2 on the basis of the information concerning the system X and the information concerning the system Y.

A fifth feature of the embodiment is summarized as a mobile station UE which performs downlink communication by carrier aggregation (Downlink Inter-band CA) using a band F1 and a band F4 and performs uplink communication in the band F4 in a mobile communication system 1. The mobile station UE includes: a reception unit 22 configured to receive from a radio base station eNB in the mobile communication system 1 information concerning a system Y operated in a band F3 adjacent to the band F1 without receiving information concerning a system X operated in a band F2 adjacent to the band F1; and a selection unit 23 configured to select a duplexer D1 (or D2) to be used in the band F1 from multiple duplexers D1 and D2 on the basis of the information concerning the system Y received by the reception unit 22.

It should be noted that the foregoing operations of the radio base station eNB and the mobile station UE may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the radio base station eNB and the mobile station UE. Otherwise, the storage medium and the processor may be provided as discrete components inside the radio base station eNB and the mobile station UE.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2011-248774 (filed on Nov. 14, 2011) is incorporated by reference in the present specification.

Industrial Applicability

As described above, the present invention can provide a mobile communication method, a radio base station, and a mobile station, which enable appropriate selection of a duplexer D1 or D2 to be used from multiple duplexers D1 and D2.

Explanation of the Reference Numerals

UE mobile station
eNB radio base station
11 setting unit
12, 24 transmission unit
21 storage unit
22 reception unit
23 selection unit

The invention claimed is:

1. A mobile communication method for a first mobile communication system operated in a first frequency band, comprising:
   a step A of causing a radio base station in the first mobile communication system to notify a mobile station of information concerning a second system operated in a second frequency band adjacent to the first frequency band and information concerning a third system operated in a third frequency band adjacent to the first frequency band; and
   a step B of causing the mobile station to select a duplexer to be used from a plurality of duplexers on the basis of the information concerning the second system and the information concerning the third system, wherein
   the second system is a system which is determined to be likely to receive an interference influence from the first mobile communication system based on the second frequency band being adjacent to an uplink frequency band of the first mobile communication system, and
   the third system is a system which is determined to be likely to exert an interference influence on the first mobile communication system based on the third frequency band being adjacent to a downlink frequency band of the first mobile communication system.

2. The mobile communication method according to claim 1, wherein
   in the step A, by use of network signaling, the radio base station notifies of the information concerning the second system and the information concerning the third system as information concerning the systems operated in the frequency bands adjacent to the first frequency band.

3. A mobile communication method of performing downlink communication by carrier aggregation using a first frequency band and a fourth frequency band and performing uplink communication in the fourth frequency band in a first mobile communication system, the method comprising:

a step A of causing a radio base station in the first mobile communication system to notify, in the first frequency band, a mobile station of information concerning a third system operated in a third frequency band adjacent to the first frequency band without notifying of information concerning a second system operated in a second frequency band adjacent to the first frequency band; and a step B of causing the mobile station to select a duplexer to be used in the first frequency band from a plurality of duplexers on the basis of the notified information concerning the third system, wherein the second system is a system which is determined to be likely to receive an interference influence from the first mobile communication system based on the second frequency band being adjacent to an uplink frequency band of the first mobile communication system, and the third system is a system which is determined to be likely to exert an interference influence on the first mobile communication system based on the third frequency band being adjacent to a downlink frequency band of the first mobile communication system.

4. A radio base station used in a first mobile communication system operated in a first frequency band, comprising:

a transmitter configured to notify a mobile station of information concerning a second system operated in a second frequency band adjacent to the first frequency band and information concerning a third system operated in a third frequency band adjacent to the first frequency band, wherein the second system is a system which is determined to be likely to receive an interference influence from the first mobile communication system based on the second frequency band being adjacent to an uplink frequency band of the first mobile communication system, and the third system is a system which is determined to be likely to exert an interference influence on the first mobile communication system based on the third frequency band being adjacent to a downlink frequency band of the first mobile communication system.

5. The radio base station according to claim 4, wherein by use of network signaling, the transmitter notifies of the information concerning the second system and the information concerning the third system as information concerning the systems operated in the frequency bands adjacent to the first frequency band.

6. A mobile station used in a first mobile communication system operated in a first frequency band, comprising:

a receiver configured to receive from a radio base station in the first mobile communication system information concerning a second system operated in a second frequency band adjacent to the first frequency band and information concerning a third system operated in a third frequency band adjacent to the first frequency band; and circuitry configured to select a duplexer to be used from a plurality of duplexers on the basis of the information concerning the second system and the information concerning the third system, wherein the second system is a system which is determined to be likely to receive an interference influence from the first mobile communication system based on the second frequency band being adjacent to an uplink frequency band of the first mobile communication system, and the third system is a system which is determined to be likely to exert an interference influence on the first mobile communication system based on the third frequency band being adjacent to a downlink frequency band of the first mobile communication system.

7. A mobile station configured to perform downlink communication by carrier aggregation using a first frequency band and a fourth frequency band and to perform uplink communication in the fourth frequency band in a first mobile communication system, the mobile station comprising:

a receiver configured to receive in the first frequency band from a radio base station in the first mobile communication system information concerning a third system operated in a third frequency band adjacent to the first frequency band without receiving information concerning a second system operated in a second frequency band adjacent to the first frequency band; and circuitry configured to select a duplexer to be used in the first frequency band from a plurality of duplexers on the basis of the information concerning the third system received by the receiver, wherein the second system is a system which is determined to be likely to receive an interference influence from the first mobile communication system based on the second frequency band being adjacent to an uplink frequency band of the first mobile communication system, and the third system is a system which is determined to be likely to exert an interference influence on the first mobile communication system based on the third frequency band being adjacent to a downlink frequency band of the first mobile communication system.

\* \* \* \* \*